Sept. 28, 1948.                H. G. BUSIGNIES                2,449,976
                      TRIDIMENSIONAL OBSTACLE DETECTION SYSTEM
                              Filed Feb. 24, 1941
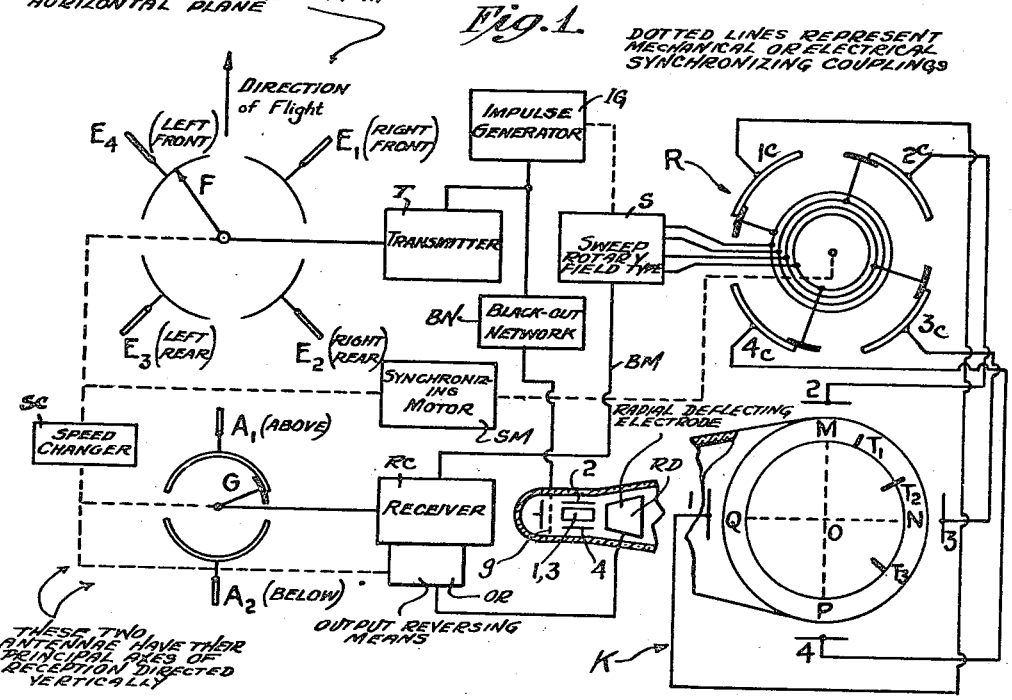
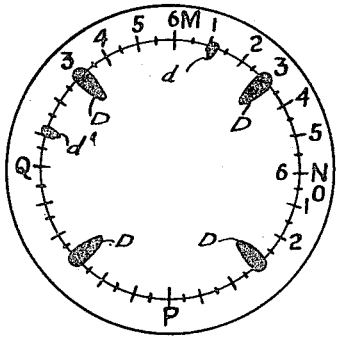
INVENTOR
HENRI G. BUSIGNIES
BY
ATTORNEY Patented Sept. 28, 1948

2,449,976

UNITED STATES PATENT OFFICE 2,449,976

TRIDIMENSIONAL OBSTACLE DETECTION SYSTEM

Henri G. Busignies, Forest Hills, N. Y., assignor to International Standard Electric Corporation, New York, N. Y., a corporation of Delaware Application February 24, 1941, Serial No. 380,184

7 Claims. (Cl. 343—10)

1

This invention relates to improvements in navigation indicating apparatus and in particular to absolute distance and directive devices.

It is an object of the invention to provide improved safety apparatus for airplanes in flight. Another object is to prevent a collision of airplanes in flight, or an airplane with terrain irregularities.

A more specific object is to provide relatively simple means carried by an airplane for informing a pilot of all obstacles within a certain safe range of his airplane and for automatically indicating their location with respect to his plane.

Still another object resides in the provision of three-dimensionally sensitive means for detecting the distance and direction of an object with respect to a given location.

Another object is to provide improved indicating means for simultaneously giving a three-dimensional indication of the location of one object with respect to another object.

Other objects and various other features of novelty and invention will doubtless occur to those skilled in the art from a reading of the following specification in conjunction with the drawings included herewith.

In said drawings

Fig. 1 is a schematic representation of an embodiment illustrative of features of the invention; and Fig. 2 is an enlarged showing of typical indications obtained with apparatus shown in Fig. 1.

Broadly speaking, in a preferred embodiment of the invention radio impulse signals are periodically transmitted from an airplane in flight. By means of an appropriate antenna array these periodic impulses may be directed successively in a plurality of different radial directions, all in the same general plane. If there is some object say another airplane, within range of a transmitted signal, a portion of this signal will be reflected. In accordance with certain features of the invention means are provided on the signal transmitting craft for detecting this reflected portion of the signal, for comparing it as to elapsed time with the corresponding transmitted signal impulse, and for detecting the general direction of a reflected signal.

In the preferred form selected in this case as illustrative of features of the invention, the transmitting equipment may include means for successively directing directive signals generally in four quadrants, all in substantially the same horizontal plane. The receiving equipment includes antenna means, synchronized with the energizing of the transmitting equipment, for alternately detecting reflected signals coming from above the said horizontal plane and from below. Preferably, say, the detecting equipment for reflected signals above the plane is operative for a single impulse signal emitted by the transmission equipment, and then alternately the apparatus for detecting reflections from underneath that plane is effective.

In the specific embodiment shown in Fig. 1, the transmitting equipment includes a four-directional antenna array $E_1$, $E_2$, $E_3$, and $E_4$, so disposed that transmitted energy from all four antennas will be in the same substantially horizontal plane, or more precisely in a reference plane having a fixed relation to the aircraft, this fixed relation being so chosen that said reference plane would be horizontal in the case of level aircraft flight. In the form shown, antennas $E_1$, $E_2$, $E_3$, $E_4$, are angularly spaced 90° from each other and are disposed four points or 45° from the line of flight. With such an arrangement it will be appreciated that $E_1$ may transmit signals in the right front quadrant with respect to the direction of flight, $E_2$ the right rear, $E_3$ the left rear and $E_4$ the left front. All these four antennae have sufficiently broad transmission patterns so that some energy is radiated in every direction although the principal directive axes are aimed horizontally in mutually perpendicular directions as described.

The transmitting equipment further includes a transmitter set, so designated by a block T in Fig. 1, successively feeding each of the antennas and supplying regularly spaced impulses thereto. The apparatus employed for the generation of impulses may be of any well known form and is shown in Fig. 1 by a block IG. Successive feeding of the antennas is accomplished in the form shown by keying means employing a rotating keying arm F driven by synchronizing motor SM. Preferably, the key F and the transmitter impulses are so synchronized that a plurality of impulses are imparted to each successive antenna for each revolution of the key F, that is, there is a still larger plurality of regular impulses per key revolution. Such synchronization, it will readily be understood, may be obtained by well known means not necessary for a showing or discussion in the present case.

In the illustrated embodiment the receiving antenna equipment includes means $A_1$ directionally sensitive to signals above the plane of $E_1$, $E_2$, $E_3$ and $E_4$, and further means $A_2$ directionally sensitive to signals received below said plane. Like transmitter antennae $E_1$, $E_2$, $E_3$, $E_4$, the receiving antennae $A_1$, $A_2$, have broad enough reception patterns so that some reception will occur even for waves arriving horizontally in spite of the fact that the axes of principal reception are directed straight up and straight down as described. Keying means G may be provided for rendering antennas $A_1$ and $A_2$ alternately effective so that the receiver set, likewise designated as a block RC, is alternately receptive to signals reflected above and below the plane, as will be clear. It will, of course, be understood that the keying means G may be either mechanical or electronic as desired, and in accordance with well known practice.

Gears or other similar means SC represented by a rectangle designated "speed changer" may be provided to link the transmitting key F and the receiving key means G. In a preferred form the ratio of such linkage is such that one antenna, say $A_1$, is effective to communicate signals to the receiver RC for one transmitted impulse, and then the antenna $A_2$ is similarly effective to the exclusion of $A_1$ for a like interval of time, and so on. It will be clear, then, that in the preferred form described, the key means G operate at a frequency, some even sub-multiple of that of the impulses, for instance G may alternate at one-half the frequency of the impulses.

It will be recalled that, in accordance with a feature of the invention, signals picked up by the antennas $A_1$ and $A_2$ are, through appropriate interpolating means such as receiver RC and output reversing means OR, reproduced upon a single indicator. In the form shown this indicator is a cathode ray tube, and it is employed simultaneously to indicate the general direction of an object, that is, general azimuth direction as well as above or below, and in addition the straight line distance of the plane from the object is also directly readable.

On the cathode ray screen it has been considered desirable to have the four quadrants, corresponding to those covered by $E_1$, $E_2$, $E_3$, and $E_4$, respectively, represented in the same general sense. Thus, the quadrant M—N appearing on the cathode ray tube, designated generally as K, may represent the quadrant covered by $E_1$, N—P that covered by $E_2$, and so on. Appropriate commutating means, designated generally as R, are further provided to assure that the quadrant M—N will record only signals emitted by $E_1$, and not by any other transmitting antenna. The same, generally speaking, is true of the quadrants N—P, P—Q, and Q—M on the cathode ray screen.

Before entering upon a detailed consideration of the preferred method of representing impulses on the cathode ray screen, the method will be dealt with generally. Let us suppose that as the key F is relaying a plurality of impulses through the transmitting antenna $E_1$, that is through the generally right front quadrant with respect to the direction of flight of the plane, an object, say another airplane, within range of the signals reflects a corresponding plurality of impulses. If this detected airplane is above the one in which the apparatus of Fig. 1 is installed, and if it is assumed for convenience of description that keying means G renders the upper antenna $A_1$ effective during the odd impulses (e. g., 1st, 3rd, 5th, etc.) and renders the lower antenna $A_2$ effective during even impulses (e. g., the 2nd, 4th, 6th, etc.) the antenna $A_1$ will detect the reflected signal on every odd emitted impulse, while the antenna $A_2$, because of its generally downward directivity will detect substantially none of the even reflected impulses. Considering the circle M—N——P—Q on the cathode ray tube screen as a reference scale, an indication $T_1$ will appear thereon to represent the signal reflected from the supposed airplane, in somewhat the following manner.

In a preferred form as the key F is relaying impulses to the antenna $E_1$, the sweep circuits of the cathode ray tube are operated to record impulses only in the quadrant M—N on the screen, so that reflections from signals transmitted from $E_1$ may not appear on any other quadrant than in M—N. Of course, very distant obstacles will reflect impulses with considerable time delay so as eventually to appear on the same quadrant M—N; however, as these objects would be so distant a received reflected signal therefrom will be correspondingly weaker, so weak in fact as not to interfere with a proper reading on the quadrant M—N for obstacles within the range represented by that quadrant. Assuming the sweep circuits to be operated in a clockwise direction in the sense of Fig. 1, and if the apparatus be so calibrated that the point M represents the instant in which a particular impulse is transmitted, a received impulse such as $T_1$ will be recorded on the screen a certain distance along the reference axis M—N——P—Q from M corresponding to the distance from the plane to the object, as will be clear. In accordance with another feature of the invention the spot $T_1$ may be made to indicate that the object detected is at a higher level than the plane in which the apparatus of Fig. 1 is installed. In the form shown means are provided in the receiver for varying the radial deflection of the spot $T_1$ outwardly of the axis M—N——P—Q, to indicate reception of the reflected signal by the antenna $A_1$ and inwardly of that axis to indicate reception of the reflected signal by the antenna $A_2$. This is done by applying the impulses from the output of receiver RC to deflecting electrode RD. Such means are represented by a block adjacent the receiver and designated as "output reversing means." Thus, it will be appreciated that the spot $T_1$ indicates to the pilot of the plane that there is another object or airplane above him and a distance proportional to the arc M—$T_1$ away.

Specifically, the sweep circuit of the cathode ray tube is synchronized with the frequency of the impulses transmitted, as indicated by the dotted line extending between the impulse generator IG and sweep circuits. In this manner sweep circuit energy applied to the cathode ray tube deflection plates, 1, 2, 3 and 4, may cause the cathode ray to make one complete revolution for each impulse transmitted. In Fig. 1 deflection plates 1, 2, 3 and 4, are twice shown—once schematically about a fluorescent screen and also in the schematic sectionalized view of the base end of the tube, in order to show the usual arrangement of cathode ray tube elements. In order to prevent an impulse emitted, say by the antenna $E_1$ from appearing on the cathode ray screen in any quadrant other than M—N, I provide means for rendering the cathode ray inoperative for the rest of the sweep circuit cycle. In the form shown, this latter means is operated by the impulse generator and comprises a black-out network BN of well known elements for so biasing a grid $g$ in the cathode ray tube during the undesired quadrants of the sweep circuit cycle, that the cathode ray is effectively blocked for the said portion of said cycle. In this manner it will be clear that impulses reflected from emission by antenna $E_1$ will only be recorded on the arc M—N of the cathode ray screen.

In order to render the apparatus effective to record similar received impulses from other quadrants, I have provided a possible commutating arrangement designated generally as R driven by synchronizing motor SM, for periodically shifting the origin of the sweep circuit operation in appropriate relation with the operation of the key F to transmit impulses in successive quadrants. It will be clear from the drawing that if the key F and the commutator R are rotated at the same speed, the contact arms of the contactor R will engage successive deflection plate circuits 1, 2, 3 and 4, as the key F transmits impulses in successive quadrants. It will further be appreciated that inasmuch as the commutator R is intermediate the sweep circuit and the deflection plates the effect of a commutation in R is to change the origin of operation of the sweep circuit as regards the deflection plates 90° with respect to the previous commutation. In this way it will be appreciated that the sweep circuits and black-out network BN will be effective to record any reflected impulses received in the right rear quadrant upon the arc N—P after a keying of the arc M—N. Similarly, the record of obstacles encountered in the left rear quadrant will thereafter be recorded along the arc P—Q, and so on until the cycle of operation is complete, whereupon a repetition takes place. By speeding up the above indicated cycle of operations sufficiently it will be clear that the cathode ray screen can be made to give an apparent simultaneous recording of detection in all quadrants. For instance, the key F and the commutator R may both be rotated at about 20 R. P. S., the impulse generator may provide very short impulses at a frequency in the neighborhood of 5000 cycles per second, and the keying means G rotated at say 2500 cycles per second. It will be clear then that the scanning of all quadrants is sufficiently rapid and recurrent to give an apparently simultaneous observation in all directions.

The spots $T_2$ and $T_3$ shown on the cathode ray tube screen in Fig. 1 represent other typical readings. It will be noted that the spot $T_2$ is approximately equally spaced either side of the reference circle M—N—P—Q. Such a reading indicates that both antennas $A_1$ and $A_2$ are receiving reflected impulses from the same object at equal intensities. Such reception further indicates that the reflecting object is at the same level as the plane in which the apparatus of Fig. 1 is installed. Since the arc M—$T_2$ is greater than the arc M—$T_1$, it will be appreciated that the object represented by $T_2$ is at a considerably greater distance from the pilot than is the object represented by the spot $T_1$.

It will be noted that the spot $T_3$ is substantially inside of the reference circle M—N—P—Q and located in the quadrant M—P. This may be interpreted to mean that $T_3$ represents an object below the pilot, to his right and behind him, at a distance represented by the arc N—$T_3$ from the pilot. Since no spots are recorded in the arc P—Q or Q—M, it will be clear that there are no other objects within range to the left of the pilot.

Fig. 2 represents an enlarged typical reading on the cathode ray screen. The respective quadrant arcs M—N, N—P, etc., have each been graduated into equal distances from their respective origin and these distances may represent miles or other units of measurements. It will be observed that each quadrant shows a large spot D located generally inwardly of the reference circle M—N—P—Q; each of the spots D is shown just under the three mile mark, and this reading may be taken to indicate that the pilot is flying over an object which appears equally in all directions and is just less than three miles from him. These spots or marks D all extend inwardly from axis MNPQ showing that the object is below the aircraft. The magnitude of the spots are equal in all quadrants indicating that the object is directly below the craft. Likewise the position in each quadrant is the same. Of course this is the earth indication that will always be apparent and because it indicates absolute altitude it may be used as a warning signal of approaching mountainous peaks. Mountain peaks ahead of the craft will show as reflecting objects on the same screen and the relative distance from the reference origins MNPQ depending upon the relative location of the peak will give an indication of the distance therefrom. It will further be noted that two similar spots $d$ and $d'$ appear each in the quadrants Q—M and M—N, respectively. Each of the spots $d$ and $d'$ is located an equal distance from its quadrant origin and is displaced the same amount inside the axis defined by circle M—N—P—Q. Such an indication may be taken as a warning of a reflecting object e. g., another airplane, flying directly in front of the pilot and a little over a mile ahead. Since the spots $d$ and $d'$ are displaced inside of the reference circle this object a mile away is below the level of flight of the plane in which the reading is taken. If the pilot observes the arcs M—$d$ and Q—$d$ getting smaller and smaller while the spots $d$ and $d'$ are shifting so as to lie directly on the reference circle M—N—P—Q like $T_2$ in Fig. 1, he may take warning that the two planes are approaching one another. By appropriate manipulation of his flying controls he may then swerve to avoid any accident. The difference in size between spots D and $d$ is a measure of the respective size of the reflecting objects.

It will be understood that for purposes of clarity many details not forming features of the invention have been omitted from the foregoing specification. For instance, no mention has been made of blocking means for rendering the receiver inoperative to record the transmitted impulse which would otherwise be very large spots at the points M, N, P and Q, as will be clear. Such means for rendering the receiver inoperative at the instant of impulse transmission are preferably provided in any conventional form and are represented in the drawings by the line BM extending from the sweep circuit to the receiver.

Although the preferred embodiment of the invention employs a high speed keying means G so as to render the antennae $A_1$ and $A_2$ alternately effective at a rate corresponding to half the impulsing rate of the impulse generator, it is also possible, in accordance with my invention, to operate the keying means G at a different rate, e. g., half the frequency of rotation of keying means F.

It will also be understood that duplicate cathode ray indicating apparatus similar to that shown in Fig. 1, may be installed at any desired locality on the airplane and operated from the same signal supply apparatus.

While the invention has been described in detail in connection with the embodiment shown, it is to be understood, of course, that various modifications, additions, and omissions may be made within the scope of the invention as defined by the appended claims.

What I claim is:

1. Apparatus for determining the position of an object with respect to the apparatus including means for periodically directing a radio signal generally in different directions lying substantially in the same reference plane, directive receiving means for receiving energy reradiated by the object in response to the signal directed by said first mentioned means, said receiving means including antenna means directionally sensitive to either side of said reference plane, indicating means responsive to said reradiated energy for indicating the distance to the object, said indicating means comprising a cathode ray oscillograph and means for scanning the cathode ray thereof repeatedly over a predetermined region, means for displacing the predetermined region over which the cathode ray is scanned in synchronism with the direction of the radio signal in different directions by said first mentioned means, whereby said indicatiing means indicates both the general direction of and a measure of the distance to the reradiating objects, and means included with said receiving means and responsive to the effective reception of a given signal by both sensitive sides of said receiving antenna means for giving an indication on said indicating means of the relative position of said reradiating object with respect to the position of the said apparatus in a direction at an angle to said reference plane.

2. Apparatus for determining the distance and direction to an object including means for directively transmitting radiant impulse energy generally throughout a sector about said means, receiving means responsive to a reflection of said radiant impulse energy from the object, indicating means responsive to energy detected by said receiving means for simultaneously indicating the distance and general direction of the reflecting object, said indicating means including a cathode ray tube and sweep circuit means operative at the frequency of the impulses transmitted and in synchronism therewith for sweeping the cathode ray of said cathode ray tube over a rotary path, and means controlled by said transmitting means and in synchronism with said impulse frequency for rendering the cathode ray of said indicating means inoperative throughout all of the sweep circuit cycle but an angle corresponding to that of said sector.

3. Apparatus for determining the distance and direction to an object including means for directively transmitting radiant impulse energy successively throughout a plurality of sectors about said means, receiving means responsive to a reflection of said radiant impulse energy from the object, indicating means responsive to energy detected by said receiving means for simultaneously indicating the distance and general direction of the reflecting object, said indicating means including a cathode ray tube, sweep circuit means operative at the frequency of the impulse transmitted and in synchronism therewith for sweeping a cathode ray of said cathode ray tube periodically from a predetermined origin over a predetermined rotary path, disabling means controlled by said transmitting means and in synchronism with said impulse frequency for rendering the cathode ray of said indicating means inoperative throughout all of the sweep circuit cycle but an angle corresponding to that of one of said sectors, and commutator means synchronized with said transmitting means for successively changing said predetermined origin, whereby the portion of said path through which said cathode ray is rendered inoperative by said disabling means is shifted in synchronism with said transmitting means.

4. Apparatus for determining the location of an object including radiant energy impulse transmitting apparatus for directively transmitting impulses in a plurality of directions in a common plane, receiving means responsive to impulse energy reflected from the object, cathode ray indicating means operated by said receiving means, a sweep circuit for the beam of said cathode ray indicating means for sweeping said cathode ray beam from a predetermined origin over a predetermined path, commutator means associated with said receiving means and said indicating means and operated in synchronism with the directing of said transmitting means, said commutator means serving to successively change said origin to provide for indication of received directive impulses on a portion of said indicating means corresponding to the general direction of the received reflected energy, said receiving means including antenna means directionally sensitive above and below said common plane, receiver network means responsive to received impulse energy from said antenna means for producing output impulses of the effective magnitude of reflected energy as received by said antenna means, and means responsive to said effective magnitude for modulating the beam of said cathode ray indicating means.

5. Apparatus according to claim 4, wherein said means for modulating cathode ray beams includes a deflecting electrode structure in said indicating means, said electrode structure being of hollow, generally frusto-conical form and coaxial with said indicating means.

6. Apparatus for determining the location of an object, including radiant energy impulse transmitting apparatus for directively transmitting impulses in a plurality of directions in a common plane, receiving means responsive to impulse energy reflected from the object, cathode ray indicating means operated by said receiving means, a sweep circuit for the beam of said cathode ray indicating means for sweeping said cathode ray beam from a predetermined origin over a predetermined path, commutator means associated with said receiving means and said indicating means and operated in synchronism with the directing of said transmitting means, said commutator means serving to successively change said origin to provide for indication of received directive impulses on a portion of said indicating means corresponding to the general direction of the received reflected energy, said receiving means including antenna means directionally sensitive above and below said common plane, and means responsive to the magnitude of a received signal for modulating the beam of said cathode ray indicating means.

7. Apparatus for determining the position of an object with respect to the apparatus, including means for periodically directing a radio signal generally in different directions lying substantially in the same plane, directive receiving means for receiving energy from the signal directed by said first mentioned means and reflected by the object, said receiving means including antenna means directionally sensitive to energy on opposite sides of the said plane, indicating means having a reference origin and responsive to said reflected energy for indicating the general direction of the reflected signals and the distance to the object, means for successively changing the reference origin of said indicating means, means for synchronizing the periodic directing of said first mentioned means with the changes of the reference origin of said indicating means, whereby said indicating means indicates both the general direction of and a measure of the distance to the reflecting object, means responsive to the amplitude of a signal received by said antenna means sensitive to energy from one side of said plane for producing an indication on said indicating means in one direction, and means responsive to the amplitude of a signal received by said antenna means sensitive to the energy from other side of said plane for producing an indication on said indicating means in another direction.

HENRI G. BUSIGNIES.

REFERENCES CITED

The following references are of record in the file of this patent:

UNITED STATES PATENTS

| Number | Name | Date |
|---|---|---|
| 1,149,122 | Fuller | Aug. 3, 1915 |
| 1,924,156 | Hart | Aug. 29, 1933 |
| 2,063,610 | Linsell | Dec. 8, 1936 |
| 2,066,156 | Muffly | Dec. 29, 1936 |
| 2,189,549 | Hershberger | Feb. 6, 1940 |
| 2,207,267 | Plaistowe | July 9, 1940 |
| 2,225,046 | Hunter | Dec. 17, 1940 |
| 2,227,598 | Lyman et al. | Jan. 7, 1941 |
| 2,412,631 | Rice | Dec. 17, 1946 |
| 2,412,702 | Wolff | Dec. 17, 1946 |

FOREIGN PATENTS

| Number | Country | Date |
|---|---|---|
| 108,556 | Australia | Sept. 14, 1939 |